United States Patent [19]

Marling

[11] 4,029,558

[45] June 14, 1977

[54] ISOTOPE ENRICHMENT BY FREQUENCY-TRIPLED TEMPERATURE TUNED NEODYMIUM LASER PHOTOLYSIS OF FORMALDEHYDE

[75] Inventor: John B. Marling, Livermore, Calif.

[73] Assignee: The United States of America as represented by the United States Energy Research and Development Administration, Washington, D.C.

[22] Filed: Oct. 22, 1976

[21] Appl. No.: 734,840

[52] U.S. Cl. .......................................... 204/158 R
[51] Int. Cl.² .......................................... B01J 1/10
[58] Field of Search ................ 204/DIG. 11, 158 R

[56] References Cited

OTHER PUBLICATIONS

Yeung et al., Applied Physics Lett. 21, No. 3, Aug. 1972, pp. 109 and 110.

Primary Examiner—Howard S. Williams
Attorney, Agent, or Firm—Dean E. Carlson; Roger S. Gaither; Irene S. Croft

[57] ABSTRACT

Enrichment of carbon, hydrogen and/or oxygen isotopes by means of isotopically selective photo-predissociation of formaldehyde is achieved by irradiation provided by a frequency-tripled, temperature tuned neodymium laser.

11 Claims, 2 Drawing Figures

ISOTOPE ENRICHMENT BY FREQUENCY-TRIPLED TEMPERATURE TUNED NEODYMIUM LASER PHOTOLYSIS OF FORMALDEHYDE

BACKGROUND OF THE INVENTION

The invention described herein was made in the course of or under Energy Research and Development Administration Contract No. W-7405-ENG-48 with University of California.

This invention relates to the enrichment of carbon, hydrogen, and/or oxygen isotopes by selective photo-predissociation of formaldehyde. More particularly, this invention relates to laser isotope enrichment by frequency-tripled, temperature tuned neodymium laser photolysis of formaldehyde.

Formaldehyde has an absorption spectrum for which the upper state is predissociated. Thousands of discrete absorption lines exist in the range of 300–355 nm (3000 A 3550 A) and all lead to photodecomposition with production of carbon monoxide and hydrogen.

The advantages of using formaldehyde for isotope separation have been presented by Yeung and Moore (E. S. Yeung and C. B. Moore, "Isotope Separation by Photo-predissociation", Appl. Phys. Lett. 21, 109–110, 1972), as a nearly ideal example of a molecule having isotopically well-resolved absorption lines for which the upper state is predissociated. Successful separation of $D_2$ from a 1:1 mixture of $D_2CO$ and $H_2CO$ was achieved using frequency-doubled ruby laser light yielding six-fold $D_2$ enrichment. Although this experiment neatly demonstrates the concept of isotope separation by laser photo-predissociation, it is not potentially applicable in practical, large scale systems for separation of rare isotopes.

Successful separation of all the rare stable isotopes naturally occurring in formaldehyde with up to 200-fold single step enrichment is described in my copending application "Ion Laser Isotope Enrichment by Photo-predissociation of Formaldehyde", Ser. No. 697,000 filed June 17, 1976. However, successful separation by means of ion lasers depends upon the existence of a fortuitous coincidence between the emission wavelength of the particular ion laser used and a suitable resonant absorption line in formaldehyde, and the use of ion lasers is limited to such matches. The need exists for a process utilizing a reliable and efficient laser having sufficient turnability to take advantage of other strong absorption lines.

SUMMARY OF THE INVENTION

The present invention provides an improved method for separating isotopes of carbon, oxygen, and/or hydrogen by selective photo-predissociation of formaldehyde. In accordance with the present invention, a gaseous formaldehyde isotope source is irradiated at a given wavelength in the range of from about 352–355 nm to selectively excite those molecules containing the desired isotope, the necessary radiation being frequency-tripled laser light provided by a neodymium laser which is tuned to the given wavelength by varying the temperature of the laser rod or crystal. The laser rod temperature is readily varied by varying the temperature of the cooling fluid for the rod. Additional tuning of the laser can be achieved by the use of an intracavity etalon. Specifically, irradiation is accomplished by means of a frequency-tripled, temperature tuned Nd-YAG ($Nd^{+3}$-yttrium aluminum garnet) laser.

The selectively excited molecules dissociate to form a product enriched in the desired isotope, and the enriched product is separated from the system.

It is, therefore, an object of this invention to provide an improved process for separating isotopes by isotopically selective photo-predissociation of formaldehyde.

Another object of this invention is the separation of isotopes by isotopically selective photo-predissociation of formaldehyde utilizing as the radiation source a temperature tuned laser.

A particular object of this invention is the separation of isotopes by isotopically selective photo-predissociation of formaldehyde utilizing frequency-tripled laser light provided by a temperature tuned neodymium laser, more specifically, a temperature tuned Nd-YAG laser.

Other objects and advantages will become apparent from the following description made with reference to the accompanying drawings.

DETAILED DESCRIPTION OF THE INVENTION

Figure 1:
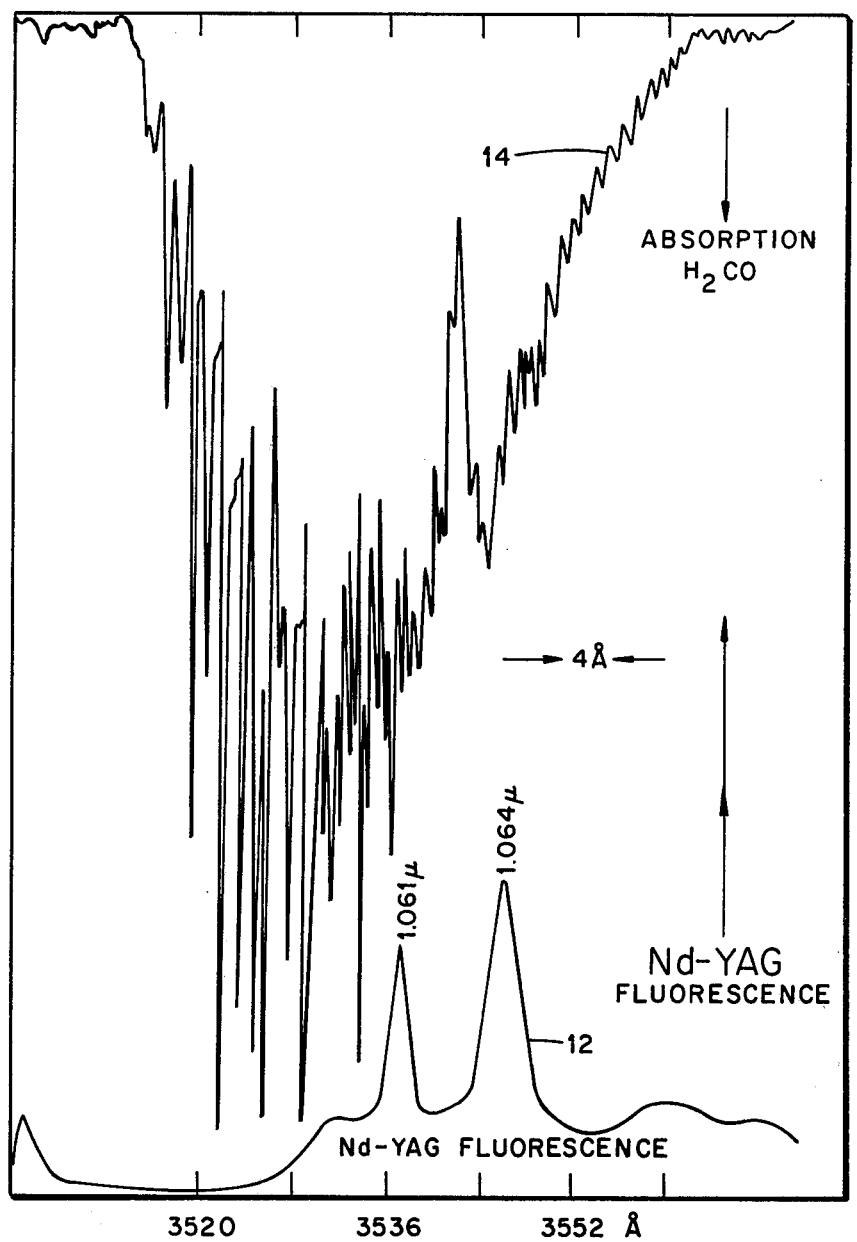
FIG. 1 is a graph comparing Nd-YAG fluorescence with formaldehyde absorption at one-third wavelength.

In accordance with the present invention, isotopes of carbon, oxygen and/or hydrogen are separated by irradiating a gaseous formaldehyde isotope source with laser light at a given wavelength in the range of from about 352–355 nm to excite those molecules of formaldehyde containing a first or desired isotope without substantially exciting those molecules containing other isotopes of the same element, the laser light being supplied by a neodymium laser the output of which is tuned by varying the temperature of the laser rod and frequency-tripled to provide the given wavelength. Fine tuning can be achieved by the use of an intracavity etalon.

Preferably, the radiation source is a frequency tripled, temperature tuned Nd-YAG laser. The temperature of the laser crystal is readily varied by varying the temperature of the cooling fluid for the crystal. It has been found that the emission wavelength of the laser increases approximately linearly with crystal temperature.

The wavelength (or frequency) of irradiation is preselected or predetermined on the basis of spectroscopic data experimentally obtained by conventional spectroscopic methods. The irradiation frequency is matched with a resonant absorption line at which those molecules of formaldehyde containing the desired isotope absorb radiation but at which those molecules containing undesired isotopes are substantially transparent. Thus, those molecules of the desired isotope species absorb the laser radiation and are thereby excited to a higher energy level whereas those molecules containing other isotopes of the same element do not substantially absorb the laser radiation and therefore remain substantially unexcited. The excited molecules then dissociate to yield a product enriched in the corresponding isotope.

Dissociation of formaldehyde proceeds by the following mechanism:

$$H_2CO + h\nu \rightarrow H_2 + CO \qquad (1)$$

The isotopically enriched product, hydrogen or carbon monoxide according to the isotopic species being selectively excited, is readily separated from undissociated formaldehyde by standard chemical procedures such as cold trapping.

Photolysis of formaldehyde can also proceed by radical dissociation as follows:

$$H_2CO + h\nu \rightarrow H + HCO \qquad (2)$$

Radical dissociation is undesirable because of losses in selectivity due to isotopic scrambling. In some cases, a paramagnetic buffer gas, such as oxygen or nitric oxide, can be added to the reaction system to suppress radical dissociation and, hence, reduce isotopic scrambling. Radical dissociation can be most effectively suppressed by exciting formaldehyde at wavelengths longer than about 330 nm, which is achieved in the present process utilizing the output in the range of about 352–355 nm from a frequency-tripled neodymium laser.

The term "neodymium laser" is used in the art to refer to a solid state laser which employs the triply charged ion of the rare earth metal neodymium ($Nd^{+3}$) in a variety of host materials. The most common host materials are glass, yttrium aluminum garnet (YAG) and calcium tungstate ($CaWO_4$). A more detailed description of neodymium laser systems can be found in "Handbook of Lasers", Robert J. Pressley, Ed., Chemical Rubber Company, Cleveland, Ohio, 1971. Neodymium lasers can be operated either Q-switched, pulsed or continuously. A major advantage of the neodymium laser over ruby is its higher efficiency owing to the fact that it is a four-level laser, i.e., its lower lasing level is above the ground state.

A particularly suitable neodymium laser system for use in the present invention is the system which uses yttrium aluminum garnet as the host material and is generally referred to as the Nd-YAG laser. The Nd-YAG laser has two emission lines at 1.061 and 1.064 micron (1 micron = $10^3$ nm) which may be frequency tripled to provide near UV (ultraviolet) at wavelengths suitable for photo-predissociation of formaldehyde. This is shown in FIG. 1 which is a graph comparing Nd-YAG fluorescence at one-third wavelength with the $4_0^1$ absorption band of formaldehyde.

Frequency-tripling of the Nd laser output is achieved by the conventional method of propagating the laser light through first and second non-linear crystals. The Nd laser radiation of frequency $\nu$ on propagating through the first crystal emerges as radiation consisting of a mixture of two frequencies, the original frequency $\nu$ and a new frequency $2\nu$. The double frequency component has, of course, a wavelength which is half that of the incident radiation. The mixture of $\nu$ and $2\nu$ emerging from the first crystal is propagated through the second crystal to provide a triple frequency component $3\nu$ which has a wavelength one-third that of the original frequency. Commonly used for frequency-doubling, also referred to as a second harmonic generation of 1.06 micron radiation, are crystals of potassium dideuterium phosphate (KD*P), potassium diydrogen phosphate (KDP), lithium niobate, lithium iodate, barium sodium niobate, and cesium dideuterium arsenate (CD*A). Crystals suitable for frequency-tripling, or third harmonic generation, include rubidium dihydrogen phosphate (RDP), potassium dihydrogen phosphate (KDP), and potassium dideuterium phosphate (KD*P). The crystals can be inserted inside or outside the laser cavity.

The frequency-tripled wavelengths may be spectrally narrowed with limited tunability by insertion of an intracavity etalon into the neodynium laser. However, the range of tunability thus obtained is not sufficiently broad to reach many of the absorption lines useful for isotope separation.

Figure 2:
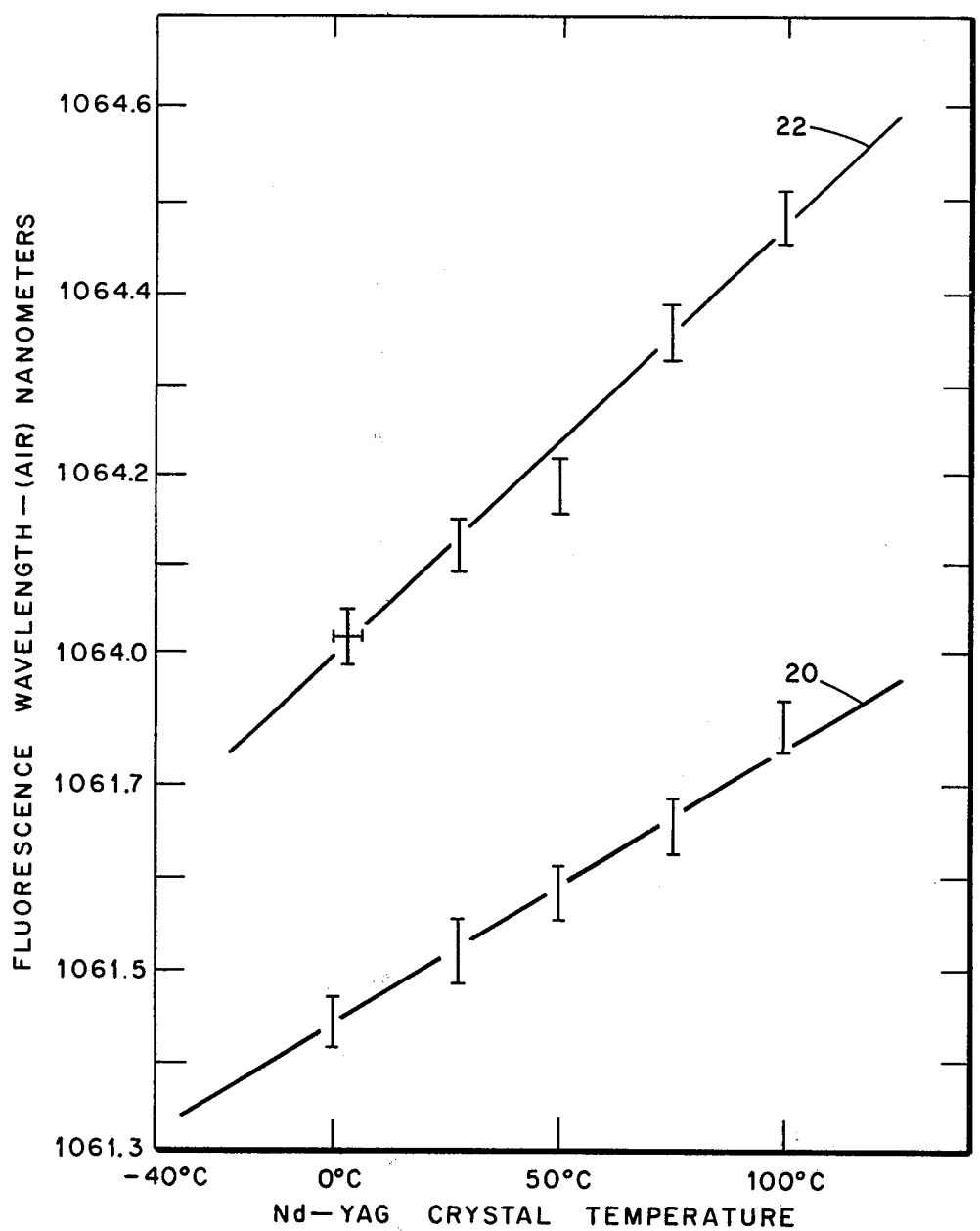
FIG. 2 is a graph showing measured output wavelength as a function of Nd-YAG crystal temperature.

According to the present invention, tunability of the frequency-tripled Nd laser over a range sufficiently wide to access a large number of absorption lines suitable for isotope separation is achieved by varying the temperature of the laser rod, which is readily accomplished by varying the temperature of the laser rod cooling fluid. The emission wavelength was found to increase approximately linearly with crystal temperature. This phenomenon is shown in FIG. 2 which is a graph of the measured output wavelength as a function of Nd-YAG crystal temperature ranging from −40° C to 100° C. In FIG. 2 numeral 20 represents the 1.061 micron transition and numeral 22 represents the 1.064 micron transition. The total tunability which can be achieved by this method for the Nd-YAG laser in a frequency-tripled configuration is from about 353.77 to about 353.91 nm using the 1.061 micron (1061 nm) transition and from about 354.60 to about 354.83 nm using the 1.064 micron (1064 nm) transition.

Useful absorption lines have been found which can be reached using the present frequency-tripled, temperature tuned Nd-YAG laser system. Such lines are given in Table I. These transitions should show enrichment factors of 30 or more in a single step in the isotopically enriched carbon monoxide or hydrogen deuteride photoproduct formed. At these wavelengths photodecomposition of formaldehyde yields about 97% or greater molecular photoproducts.

TABLE I

Transitions in Isotopic Formaldehyde Accessible by a Frequency-Tripled, Temperature Tuned Nd-YAG Laser.

| Laser Line | $C^{18}O$ Photo-product, nm ± .002 | $^{13}CO$ Photo-product, nm ± .002 | HD Photo-product nm ± .002 |
|---|---|---|---|
| 1.061 micron (frequency-tripled) | 353.804 | 353.761 | 353.796 |
|  | .811 | .804 | .813 |
|  | .816 | .809 | .820 |
|  | .865 | .840 | .858 |
|  | .898 | .890 | .890 |
|  |  | .903 | .891 |
|  |  |  | .899 |
|  |  |  | .900 |
| 1.064 micron (frequency-tripled) | 354.609 | 354.666 | 354.779 |
|  | .661 | .677 |  |
|  | .679 | .741 |  |
|  | .739 | .764 |  |
|  | .747 | .823 |  |
|  | .771 | .832 |  |

The large number of useful lines that can be reached using the system of the present invention are expected to provide a spectral match resulting in 100-fold or greater single step isotopic selectivity. At an operating efficiency of 0.1%, this should permit a 10-fold cost reduction to about $10/gm of enriched product.

The process of the present invention is illustrated by the following example.

EXAMPLE

A monomeric formaldehyde gas sample is prepared by heating commerically obtainable formaldehyde polymer. Multiple distillation of the monomer at the temperature of a dry-ice and acetone slurry provides a relatively pure gas sample free of water. An absorption cell is filled with the formaldehyde gas at total pressure of 50 torr at a temperature of about 70° C (selected in order to avoid polymerization).

The formaldehyde gas sample is irradiated with laser light provided by a Nd-YAG laser system in a frequency-tripled configuration using the 1.064 micron transition, frequency-tripling being achieved by passing the laser light through, successively, a cesium dideuterium arsenate crystal and a rubidium dihydrogen phosphate crystal which are placed inside the laser cavity. An intracavity etalon is inserted in the laser to permit spectral narrowing (fine tuning) of the frequency-tripled wavelengths. Formaldehyde fluorescence is monitored and the laser system is tuned to the 353.679 nm absorption line in formaldehyde, selective for $H_2C^{18}O$, by adjusting the temperature of the laser rod cooling fluid so that the temperature of the laser rod is in the range of 5–25° C and by adjusting the intracavity etalon for the maximum ratio of rare to common isotope formaldehyde fluorescence. The laser is operated in a low-order Q-switched mode with flashlamp excitation.

The gas sample is irradiated for a period of about one hour at an average laser power of about 5 watts/m³ volume in the reaction chamber with an optical path length of about 100 meters. The selectively excited $H_2C^{18}O$ molecules dissociate to produce $C^{18}O$ and hydrogen. The irradiated gas mixture is then passed through a liquid nitrogen cold trap in order to freeze out undissociated formaldehyde, and hydrogen is separated from the $C^{18}O$ photoproduct. A yield of one-half gm of 20% $C^{18}O$ per m³ volume in the reaction chamber is obtained, representing a single stage enrichment of about 100-fold.

The laser system used in the present process has the advantage of high efficiency; overall laser system electrical efficiency is of the order of 0.05–0.2%. The Nd-YAG laser can operate at about 0.5% efficiency in the Q-switched mode with flashlamp pumping and at about 2% with cw krypton-arc-lamp excitation. The frequency-tripling efficiency is about 10%, permitting an overall energy efficiency of about 0.1% for generation of tunable near ultraviolet monochromatic light. The present laser system also offers the additional advantage of reliability since no dye laser is involved, and thousand hour lamp lifetime is easy to achieve in Nd-YAG laser systems.

Although the invention has been described with reference to preferred embodiments, various modifications and changes will be apparent to those skilled in the art, all of which may be achieved without departing from the spirit and scope of the invention as defined by the following claims.

What I claim is:

1. A method for separating isotopes of at least one of the elements carbon, hydrogen and oxygen by selective photo-predissociation of formaldehyde which comprises:

subjecting a gaseous formaldehyde isotope source material to laser radiation at a given wavelength in the range of from about 352 nanometers to about 355 nanometers which excites those molecules of formaldehyde containing a desired isotope without substantially exciting those molecules of formaldehyde containing an undesired isotope of the same element, the excited molecules thereby dissociating to form a product enriched in the desired isotope without substantial dissociation of unexcited molecules, providing said laser radiation by means of a neodymium laser in a frequency-tripled configuration, said laser being tuned to said given wavelength by varying the temperature of the laser crystal, and separating the dissociation product enriched in the desired isotope from the reaction system.

2. A method according to claim 1 wherein the temperature of the laser crystal is varied by varying the temperature of the laser crystal cooling fluid.

3. A method according to claim 1 wherein the temperature of the laser crystal is varied in the range between about −40° C and about 100° C.

4. A method according to claim 1 wherein the neodymium laser is a neodymium-yttrium aluminum garnet laser.

5. A method according to claim 4 wherein the given wavelength is in the range of from about 353.77 to about 353.91 and is provided by the laser transition at about 1061 nanometers.

6. A method according to claim 4 wherein the given wavelength is in the range of from about 354.60 nanometers to about 354.83 nanometers and is provided by the laser transition at about 1064 nanometers.

7. A method according to claim 1 wherein the desired isotope is $^{13}C$.

8. A method according to claim 1 wherein the desired isotope is $^{18}O$.

9. A method according to claim 1 wherein the desired isotope is $^{17}O$.

10. A method according to claim 1 wherein the desired isotope is deuterium.

11. A method according to claim 1 further defined by providing said laser with an intracavity etalon and adjusting said etalon for the maximum ratio of desired to undesired isotope formaldehyde fluorescence.

* * * * *